E. G. THOMAS.
INDICATING MECHANISM FOR SCALES.
APPLICATION FILED FEB. 1, 1918.

1,360,154.

Patented Nov. 23, 1920.
3 SHEETS—SHEET 1.

Inventor
Edward G. Thomas
By George R. Frye
Attorney

Witnesses

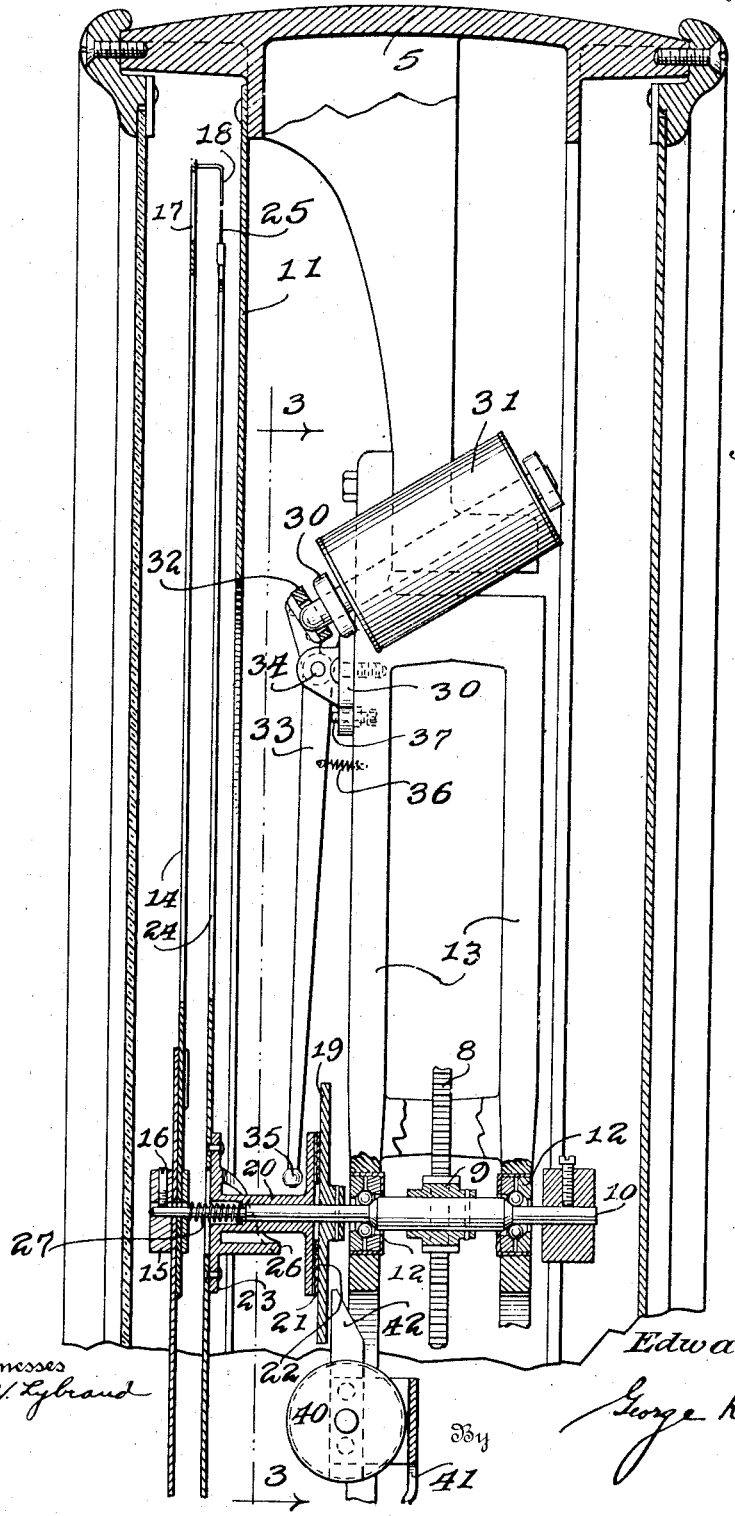

E. G. THOMAS.
INDICATING MECHANISM FOR SCALES.
APPLICATION FILED FEB. 1, 1918.

1,360,154.

Patented Nov. 23, 1920.
3 SHEETS—SHEET 3.

Inventor
Edward G. Thomas

Witnesses
H. H. Lybrand

By George R. Frye
Attorney

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

INDICATING MECHANISM FOR SCALES.

1,360,154.      Specification of Letters Patent.      Patented Nov. 23, 1920.

Application filed February 1, 1918. Serial No. 214,803.

*To all whom it may concern:*

Be it known that I, EDWARD G. THOMAS, a citizen of the United States, residing at Toledo, in the county of Lucas and State of Ohio, have invented certain new and useful Improvements in Indicating Mechanism for Scales, of which the following is a specification.

This invention relates to weighing scales, and more particularly to indicating means therefor arranged to conveniently and accurately indicate the net, gross and tare weights of articles being weighed.

The primary object of the invention is to provide a scale having a plurality of indicator hands positioned to indicate in unison the weights of articles upon the scale platform, while one or more of the indicating hands may be adjusted relatively to the other or others of said indicating hands by electrical means, enabling the operator to reset said indicating hands from any desired position without disturbing the remaining indicator hands.

Furthermore, this invention provides means for indicating multiple weighings, wherein packages or articles may be separately weighed without necessitating the removal of any of them from the scale platform until all have been weighed, thereby enabling the operator to keep together an invoice of goods for delivery or shipment; or for accurately weighing the several ingredients that enter into a compound of medicine, a mixture of bread, etc., or the formula of an alloy of metals, the compounding whereof may be performed without necessitating the removal of the container or holding vessel from the scale platform.

With the above and other objects in view which will readily appear after the invention is better understood, my invention consists in the novel construction, combination and arrangement of parts to be hereinafter more fully described and particularly pointed out in the appended claims.

Reference is to be had to the accompanying drawings illustrating a preferred embodiment of my invention and wherein similar reference numerals designate similar parts throughout the several views.

In the drawings:—

Fig. 2 is a side elevation thereof with parts broken away to portray the interior mechanism;

Figure 1:
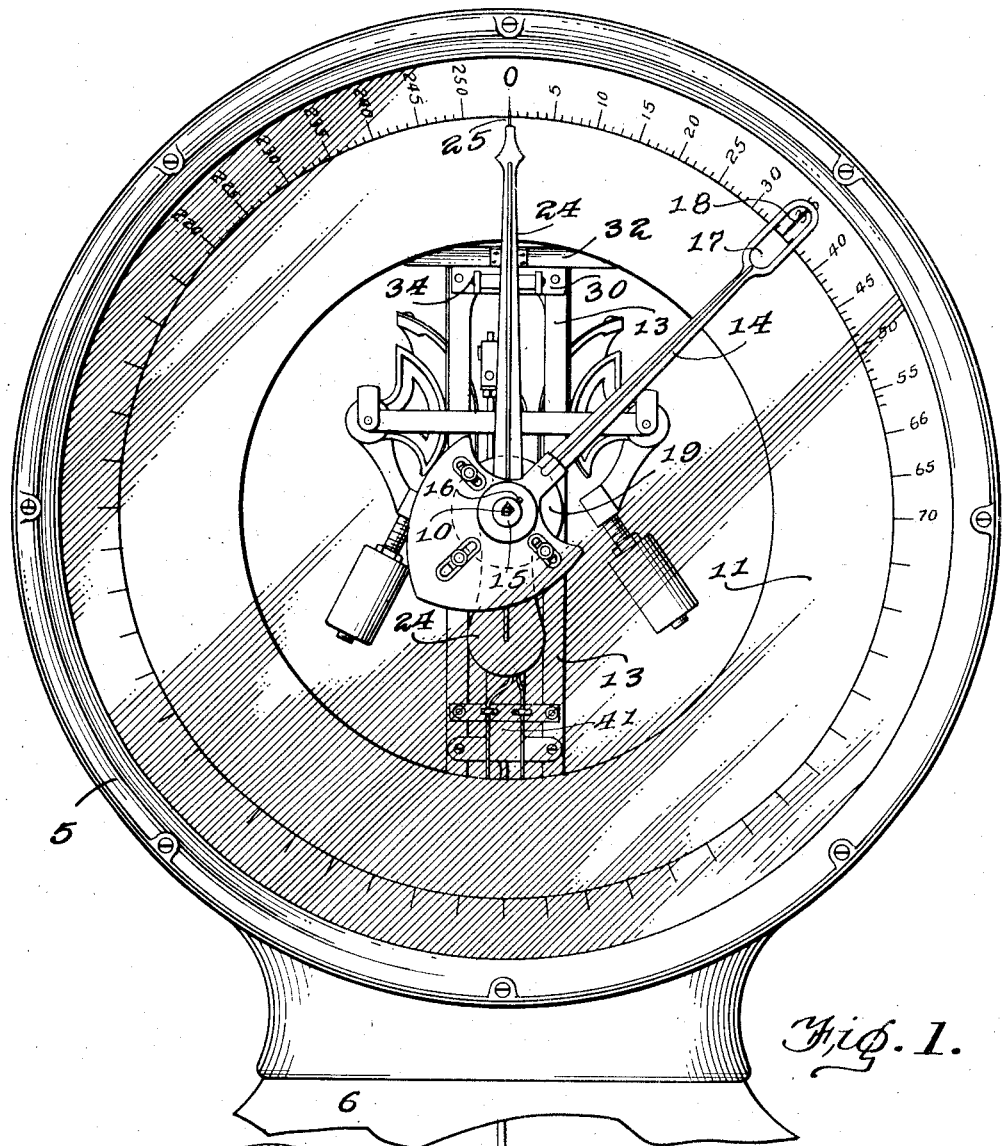
Figure 1 is a front elevation of the upper portion of a scale showing an embodiment of my invention.
Figure 4:
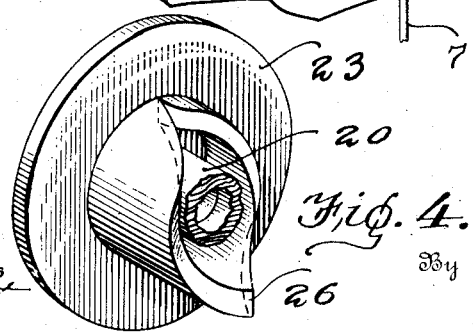
Fig. 4 is an isometric view of a heart-shaped cam which is employed in the mechanism.
Figure 3:
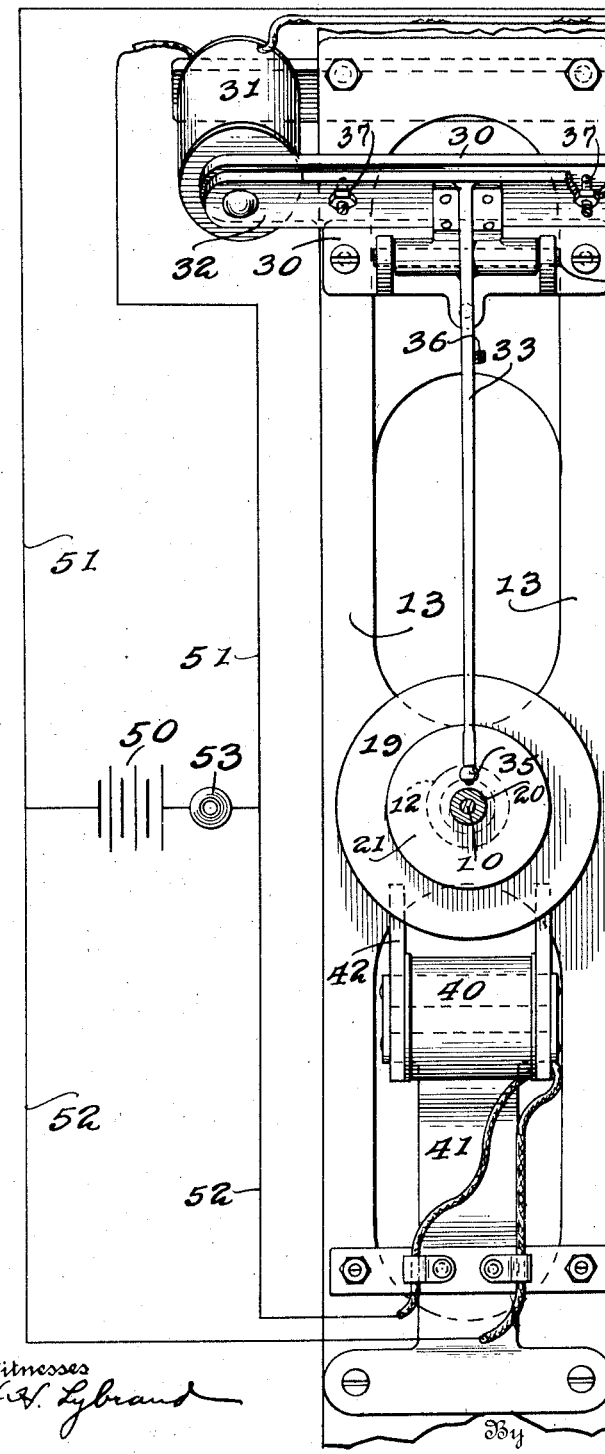
Fig. 3 is a front elevation of the apparatus and a portion of the supporting frame, the casing of the scale having been entirely removed.
Figure 5:
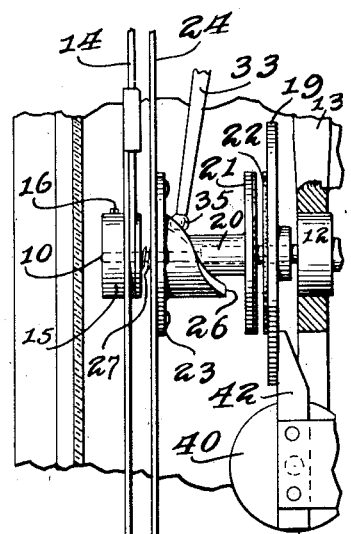
Fig. 5 is a side view of a portion of the apparatus on the same scale as Fig. 3 illustrating the position of parts when the mechanism is in operating position.

In the drawings, 5 designates the casing of a scale adapted to inclose the weighing mechanism and supported upon a suitable column 6, the lower end of which rests on the platform mechanism (not shown). It is to be understood that any suitable platform or platform lever mechanism may be employed in connection with the weighing mechanism of the scale, and the weighing mechanism herein shown is illustrated merely for the purpose of showing one application of the indicating mechanism upon a well-known scale. The particular pendulum weighing mechanism herein shown has been found to successfully demonstrate the capabilities of this invention and comprises a double pendulum scale adapted to be suitably connected with the platform lever mechanism through the medium of an adjustable hook rod 7 and so arranged and positioned that upon the placing of a load upon the scale platform the pendulums will be swung upwardly into a position counterbalancing the weight of the load on the platform, connection being made from the weighing mechanism whereby the upward movement of the pendulums will be transmitted to the indicating mechanism through a rack 8 meshing with a pinion 9 on the indicating shaft 10. A plurality of indicator hands are arranged to be rotated upon movement of the indicating shaft and coöperate with the dial 11 to indicate the weight or weights of articles placed upon the scale platform. Inasmuch as the present invention is not dependent for its operation upon any particular form of pendulum weighing mechanism, no attempt is made in this application to show a complete scale mechanism nor to portray the action of the scale in its load-counterbalancing or weighing operations, only so much of the pendulum weighing mechanism being shown as is necessary to clearly show the operation and coaction of the claimed invention herein disclosed.

The indicating shaft 10 is supported in ball bearings 12 mounted in the framework 13 of the scale, these ball bearings being arranged one on each side of the pinion 9, as shown in Fig. 2. At the forward end of the shaft 10 an indicating hand 14 is firmly secured by means of a hub 15 fastened to the indicating shaft 10 by a set screw 16. The indicating hand 14 is made with an opening 17 through which the indications of the dial 11 appear, and is further provided with a pointer 18 projecting backward toward the dial 11 so as to register closely therewith and thus accurately indicate the reading of indicating hand 14. This indicating hand at all times, therefore, will indicate in the usual manner the total weight of the load upon the platform of the weighing mechanism. A disk 19 of magnetic material is firmly secured to the shaft 10 for rotation therewith and is preferably provided with a facing of leather 22 to coöperate with a similar facing on the adjacent flange 21 of the sleeve 20 loosely journaled upon the shaft 10. The sleeve 20 is further provided at its forward end with an outwardly-extending flange 23 to which is secured an accurately-balanced adjustable indicating hand 24 having a pointer 25 which registers with the indications upon the dial 11 and indicates a reading thereon. The sleeve 20 also carries an axial heart-shaped cam 26, the purpose of which will be later disclosed. The spring 27 tends to normally force the sleeve 20 against the disk 19 with sufficient force to insure frictional engagement and rotation between disk 19 and flange 21 whereby the adjustable indicating hand 24 and fixed indicating hand 14 move together during the weighing operations of the scale.

Secured to the frame 13 by a bracket 30 is a magnet 31. An armature 32 is attached to a lever 33 pivoted at the point 34 in bracket 30. The shape of the ends of the cores of the magnet and their relation to the armature 32 are such as to cause the magnet to produce a pull of moderate force over a considerable distance. On the lower end of the lever 33 is a roller 35 which is so located as to register with the eccentric surface of the heart-shaped cam 26. The lever 33, when the magnet 31 is not energized, is retained in the position shown in Fig. 2 by the coördinate action of a tension spring 36 and an adjustable stop 37 and in this position will not engage the heart-shaped cam 26 at any point in its rotation. If, however, the magnet 31 is energized, the armature 32 will be attracted, forcing the roller 35 toward the left. In its movement it will engage the surface of the heart-shaped cam 70 at a point dependent on the indication of the pointer 24 at the moment. The movement of the roller 35 first forces the sleeve 20 to which the heart-shaped cam 26 is attached slightly toward the left against the opposing force of spring 27. This axial motion of the sleeve 20 will carry its frictional surface 22 out of contact with the disk 19, thus permitting independent rotation of the sleeve 20 and attached parts under the cam action of the roller 35 and heart-shaped cam 26. Further movement of the roller then rotates the sleeve 20 and attached parts until the roller 35 reaches the lowest point of the cam and rests in the V formed by the meeting of the two sides of the cam 26, the pointer 24 being preferably secured to the flange 23 in such a relation that when the motion of the cam stops on the arrival of the roller 35 in the V mentioned above, the indication will be zero upon the dial 11. Thus, the action of the roller and cam will be to return the indicator 24 from any position it may occupy upon the chart to the zero position.

A magnet 40 flexibly supported upon a bracket 41 attached to the frame 13 is located below the disk 19 and is provided with upwardly-extending pole pieces 42 which project above the periphery of the disk 19 and which are so shaped as to accurately register with the rear surface of disk 19 when brought in contact therewith. When the magnet 40 is not energized it will be so located by the flexible bracket 41 that the pole pieces 42 will not touch the disk 19 but will be separated therefrom by a small distance, and disk 19 will be free to turn with shaft 10 under the action of the weighing mechanism. If, however, the magnet 40 is energized, disk 19 will form a part of its magnetic circuit and the magnet will be drawn to the left in Fig. 2 until the pole pieces 42 are in contact with the disk 19. As long as the magnet 40 remains energized these pole pieces will be firmly held against the disk 19 and prevent its rotation.

In order that the indication of the fixed pointer 14 may not be disturbed during the movement of the sleeve 20 by its friction upon shaft 10 the magnet 40 is simultaneously energized with magnet 31, the current for the magnets being furnished by a source of electricity 50, circuits 51 and 52 controlled by a switch 53 which in closing completes both circuits 51 and 52 and which may be located at any convenient point either upon the scale or at any distance preferred.

The operation of the device which will now be described is as follows: When an article is placed upon the scale platform the weighing mechanism of the scale is moved to offset the weight of such article and in so doing rotates the indicating shaft 10 through the medium of the pinion 9 and rack 8, thereby rotating the fixed indicating hand 14 through an arc sufficient to indicate on the dial 11 the weight of such article. Since normally the sleeve 20 carrying the adjustable indicating hand 24 is pressed against the disk 19 by the spring 27, the adjustable indicating hand 24 will likewise be rotated through the same arc and in unison with the fixed indicating hand 14. Thus, when it is desired to secure only the gross weight of the article or articles, the fixed and adjustable indicating hands operate together to indicate such weights. When, however, it is desired to utilize the scale as a net, gross and tare weight indicator the container, such as a box or holding vessel, is first placed on the platform and both of the indicating hands 14 and 24 are rotated by the weighing mechanism until the weight of the container is indicated on the dial 11. The adjustable indicating hand 24 is then returned to the zero position by closing the circuits of magnets 31 and 40 by closing the switch 53, whereupon the disk 19 and pole pieces 42 are brought into firm contact and the fixed indicating hand held in its position during the operation of re-setting the adjustable indicating hand. The magnet 31 will force the roller 35 to the left, which in turn will force the sleeve 20 away from the disk 19 and release the frictional clutch formed by the flange 21 and disk 19. The further movement of the roller 35 will turn the sleeve 20 until the roller 35 is at its lowest point where the adjustable indicating hand 24 will indicate zero. If the switch 53 is opened, deënergizing magnets 31 and 40, roller 35 will be returned to its original position by the spring 36, permitting spring 27 to force sleeve 20 into frictional contact with disk 19, while pole pieces 42 will recede from disk 19 so as to permit its free rotation, and all parts of the apparatus will again be in condition for any weighing operation which the scale may be called on to perform, except that the location of the pointers 18 and 25 will now be separated by an arc representing the weight of the container on the scale platform. If, now, material is placed in the container, the shaft 10 will be further rotated to a point of balance between the total weight and the pendulum mechanism, and both the fixed indicating hand 14 and the adjustable indicating hand will be rotated in unison with shaft 10 to new locations wherein the fixed indicating hand 14 will indicate upon the dial 11 the total weight of the container and its contents and the adjustable indicating hand 24 will indicate the weight of the contents of the container only, thus giving the gross weight, net weight, and, by subtraction of one reading from the other, the tare of the weighing operation which has been performed.

Should it be desired to weigh other articles in the same container without removing the commodity first placed therein—for instance, in the mixing of compounds—the adjustable indicating hand can again be returned to zero by again closing switch 53, as previously described, after which the next commodity may be placed upon the platform of the scale. The two hands will thereupon rotate together until the combined weights of all the articles on the platform are indicated by the fixed hand 14. The weight of the last commodity placed on the platform will be shown by the reading of the adjustable indicating hand 24. This operation may be repeatedly performed until the full capacity of the dial has been reached, and in case the scale is also equipped with beams the weights can be transferred to such capacity beams, thereby returning both the fixed and adjustable hands into registration with the zero graduation, and additional weighings can be continued until the full weighing capacity of the scale is reached.

While it is apparent that the illustrated embodiment of my invention herein disclosed is well calculated to adequately fulfil the objects primarily stated, it is to be understood that my invention is susceptible to variation, modification and change without departing from the spirit and scope of the invention as set forth in the subjoined claims.

Having described my invention, I claim:

1. In a scale and in combination with the weighing mechanism thereof, a pair of concentrically pivoted indicator hands, one of which is directly connected with the weighing mechanism, a clutch normally connecting the second indicator hand with the weighing mechanism for simultaneous rotation with the first-mentioned hand, means for locking the first-mentioned indicator hand in any angular position, and means for producing successive axial and rotative movement of the second indicator hand to disconnect the same and then rotate it relatively to the first indicator hand.

2. In a scale and in combination with the weighing mechanism thereof, a pair of concentrically pivoted indicator hands, one of which is directly connected with the weighing mechanism, a clutch normally connecting the second indicator hand with the weighing mechanism for simultaneous rotation with the first-mentioned hand, electrically-actuated means for locking the first-mentioned indicator hand in any angular position, and means for producing successive axial and rotative movement of the second indicator hand to disconnect the same and then rotate it relatively to the first indicator hand.

3. In a scale and in combination with the weighing mechanism thereof, a pair of concentrically pivoted indicator hands, one of which is directly connected with the weighing mechanism of the scale, means normally connecting the second indicator hand with the weighing mechanism for simultaneous rotation with the first-mentioned hand, and switch-controlled means for locking the first indicator hand in any angular position and then rotating the second indicator hand relatively to the locked indicator hand.

4. In a scale and in combination with the weighing mechanism thereof, a pair of concentrically pivoted indicator hands, one of which is directly connected with the weighing mechanism of the scale, means normally connecting the second indicator hand with the weighing mechanism for simultaneous rotation with the first-mentioned hand, and electrically actuated switch-controlled means for locking the first indicator hand in any angular position and rotating the second indicator hand relatively to the locked indicator hand.

5. In a scale and in combination with the weighing mechanism thereof, a pair of concentrically pivoted indicator hands, one of which is directly connected with the weighing mechanism of the scale, means normally connecting the second indicator hand with the weighing mechanism for simultaneous rotation with the first-mentioned hand, and switch-controlled means for locking the first indicator hand in any angular position and then producing successive axial and rotative movements of the first indicator hand to free the same and then rotate it relatively to the first indicator hand.

6. In a scale and in combination with the weighing mechanism thereof, a pair of concentrically pivoted indicatotr hands, one of which is directly connected with the weighing mechanism of the scale, means normally connecting the second indicator hand with the weighing mechanism for simultaneous rotation with the first-mentioned hand, and electrically actuated switch-controlled means for locking the first indicator hand in any angular position and then producing successive axial and rotative movements of the first indicator hand to free the same and then rotate it relatively to the first indicator hand.

7. In a scale and in combination with the weighing mechanism thereof, a pair of concentrically pivoted indicator hands, one of which is directly connected with the weighing mechanism of the scale, a clutch connecting the second indicator hand with the weighing mechanism for simultaneous rotation with the first-mentioned hand, means for locking the first indicator hand in any angular position, and electrically actuated means including a magnet, the armature of which carries a member arranged to produce successive axial and rotative movements of the second indicator hand to disconnect the same and then rotate it relatively to the first indicator hand.

8. In a scale and in combination with the weighing mechanism thereof, a pair of concentrically pivoted indicator hands, one of which is directly connected with the weighing mechanism of the scale, a clutch connecting the second indicator hand with the weighing mechanism for simultaneous rotation with the first-mentioned hand, electrically actuated means for locking the first indicator hand in any angular position, and electrically actuated means including a circuit, a member adapted upon completion of the circuit to be moved into position to produce successive axial and rotative movements of the second indicator hand to disconnect the same and then rotate it relatively to the first indicator hand.

9. In a scale and in combination with the weighing mechanism thereof, a pair of concentrically pivoted indicator hands, one of which is directly connected with the weighing mechanism of the scale, a clutch connecting the second indicator hand with the weighing mechanism for simultaneous rotation with the first-mentioned hand, an axial heart-shaped cam connected with the second indicator hand, means for locking the first indicator hand in any angular position, and means for engaging the heart-shaped cam to produce successive axial and rotative movements of the second indicator hand to disconnect the same and then rotate it relatively to the first indicator hand.

10. In a scale and in combination with the weighing mechanism thereof, a pair of concentrically pivoted indicator hands, one of which is directly connected with the weighing mechanism of the scale, a clutch connecting the second indicator hand with the weighing mechanism for simultaneous rotation with the first-mentioned hand, an axial heart-shaped cam connected with the second indicator hand, electrically actuated means for locking the first indicator hand in any angular position, and electrically actuated means including a member arranged to engage the heart-shaped cam to produce successive axial and rotative movements of the second indicator hand to disconnect the same and then rotate it relatively to the first indicator hand.

11. In a scale and in combination with the weighing mechanism thereof, a pair of concentrically pivoted indicator hands, one of which is directly connected with the weighing mechanism of the scale, a clutch connecting the second indicator hand with the weighing mechanism for simultaneous rotation with the first-mentioned hand, an axial heart-shaped cam connected with the second indicator hand, means for locking the first indicator hand in any angular position, a member arranged to engage the heart-shaped cam by a movement parallel with the axis of rotation of said indicator hand, and means for moving said member in the described direction.

12. In a scale and in combination with the weighing mechanism thereof, a pair of concentrically pivoted indicator hands, one of which is directly connected with the weighing mechanism of the scale, a clutch connecting the second indicator hand with the weighing mechanism for simultaneous rotation with the first-mentioned hand, an axial heart-shaped cam connected with the second indicator hand, electrically actuated means for locking the first indicator hand in any angular position, a member arranged to engage the heart-shaped cam by a movement parallel with the axis of rotation of said indicator hand, and electrically actuated means for moving said member in the described direction.

13. In a scale and in combination with the weighing mechanism thereof, a pair of concentrically pivoted indicator hands, one of which is directly connected with the weighing mechanism of the scale, a clutch connecting the second indicator hand with the weighing mechanism for simultaneous rotation with the first-mentioned hand, an axial heart-shaped cam connected with the second indicator hand, electrically actuated means for locking the first indicator hand in any angular position, a member arranged to engage the heart-shaped cam by a movement parallel with the axis of rotation of said indicator hand, and electrically actuated means including a magnet, the armature of which carries a member arranged for moving said member in the described direction.

14. In a scale and in combination with the weighing mechanism thereof, a pair of concentrically pivoted indicator hands, one of which is directly connected with the weighing mechanism of the scale, a clutch connecting the second indicator hand with the weighing mechanism for simultaneous rotation with the first-mentioned hand, means for locking the first indicator hand in any angular position, an axial heart-shaped cam connected with the second indicator hand, a pivoted lever arranged to engage the heart-shaped cam by a movement in a plane parallel to the axis of rotation of said indicator hands, and means for imparting motion to said lever.

15. In a scale and in combination with the weighing mechanism thereof, a pair of concentrically pivoted indicator hands, one of which is directly connected with the weighing mechanism of the scale, a clutch connecting the second indicator hand with the weighing mechanism for simultaneous rotation with the first-mentioned hand, means for locking the first indicator hand in any angular position, an axial heart-shaped cam connecting with the second indicator hand, a pivoted member carrying a roller arranged to engage the heart-shaped cam by a movement in a plane parallel to the axis of rotation of said indicator hands, and means for imparting motion to said lever.

16. In a scale and in combination with the weighing mechanism thereof, a pair of concentrically pivoted indicator hands, one of which is directly connected with the weighing mechanism of the scale, a clutch connecting the second indicator hand with the weighing mechanism for simultaneous rotation with the first-mentioned hand, an axial heart-shaped cam connected with the second indicator hand, electrically actuated means for locking the first indicator hand in any angular position, a pivoted lever arranged to engage the heart-shaped cam by a movement in a plane parallel to the axis of rotation of said indicator hands, an armature connected with said lever, an electro-magnet mounted on the framework of the scale, and circuit-closing means to energize the magnet to impart motion to said lever.

17. In a scale and in combination with the weighing mechanism thereof, a pair of concentrically pivoted indicator hands, one of which is directly connected with the weighing mechanism of the scale, a clutch connecting the second indicator hand with the weighing mechanism for simultaneous rotation with the first-mentioned hand, an axial heart-shaped cam connected with the second indicator hand, electrically actuated means for locking the first indicator hand in any angular position, a pivoted lever arranged to engage the heart-shaped cam by a movement in a plane parallel to the axis of rotation of said indicator hands, and electrically actuated means for imparting motion to said lever.

18. In a scale and in combination with the weighing mechanism thereof, a pair of concentrically pivoted indicator hands, one of which is directly connected with the weighing mechanism of the scale, a clutch connecting the second indicator hand with the weighing mechanism for simultaneous rotation with the first mentioned hand, an axial heart-shaped cam connected with the second indicator hand, a disk of magnetic material secured to the first indicator hand, magnetic locking means arranged to co-act with said disk to lock the first indicator hand in any angular position, and electrically actuated means for freeing the second indicator hand and then rotating it relatively to the locked indicator hand.

19. In a scale and in combination with the weighing mechanism thereof, a pair of concentrically pivoted indicator hands, one of which is directly connected with the weighing mechanism of the scale, a clutch connecting the second indicator hand with the weighing mechanism for simultaneous rotation with the first-mentioned hand, an axial heart-shaped cam connected with the second indicator hand, a disk of magnetic material secured to the first indicator hand, a circuit provided with a magnetic locking means to lock the first-named indicator hand, and a magnet, the armature of which carries a member arranged to engage the second indicator hand to free the same and then rotate it relatively to the locked indicator hand.

EDWARD G. THOMAS.

Witnesses:
A. H. BEELEY.
H. H. LYBRAND.